United States Patent [19]

Nagasaki et al.

[11] Patent Number: 5,573,670
[45] Date of Patent: Nov. 12, 1996

[54] METHOD FOR TREATMENT OF WASTE WATER BY ACTIVATED SLUDGE PROCESS

[75] Inventors: Yoshimi Nagasaki; Hidetsugu Nakazawa, both of Kawasaki, Japan

[73] Assignee: Ajinomoto Co., Inc., Tokyo, Japan

[21] Appl. No.: 361,455

[22] Filed: Dec. 21, 1994

Related U.S. Application Data

[63] Continuation of Ser. No. 239,928, May 9, 1994, abandoned, which is a continuation of Ser. No. 780,306, Oct. 22, 1991, abandoned.

[30] Foreign Application Priority Data

Nov. 7, 1990 [JP] Japan ..................... 2-299851
Oct. 2, 1991 [JP] Japan ..................... 3-254856

[51] Int. Cl.$^6$ .................................. C02F 3/12
[52] U.S. Cl. .................. 210/614; 210/626; 210/631
[58] Field of Search ...................... 210/631, 760, 210/605, 614, 623, 626, 628–631

[56] References Cited

U.S. PATENT DOCUMENTS 3,805,481  4/1974  Armstrong ................. 210/220
5,160,621  11/1992  Nagasaki et al. .............. 210/614

FOREIGN PATENT DOCUMENTS 2422601  11/1979  France.
2490208  3/1982  France.
2626568  4/1989  France.

*Primary Examiner*—Thomas G. Wyse
*Attorney, Agent, or Firm*—Oblon, Spivak, McClelland, Maier & Neustadt, P.C.

[57] ABSTRACT

Waste water is treated by an activated sludge process, the equipment for which is provided with an aeration tank unit comprised of three tanks of a first tank, a second tank and a third tank, said waste water and microorganisms being fed into the first tank while the ratio of aeration in the first tank ranges from 0.5 to 0.8 by volume/minute relative to the amount of liquid in the first tank, the ratio of aeration in the second tank ranges from 0.1 to 0.4 by volume/minute relative to the amount of liquid in the said second tank and the ratio of aeration in the third tank ranges from 0.1 to 0.3 by volume/minute relative to the amount of liquid in the third tank, the improvement which comprises carrying out said treatment by passing air containing ozone in an amount of from 0.01 to 0.16 wt. % relative to the amount of oxygen during the aeration into the first tank.

8 Claims, No Drawings

METHOD FOR TREATMENT OF WASTE WATER BY ACTIVATED SLUDGE PROCESS

This application is a Continuation of application Ser. No. 08/239,928, filed on May 9, 1994, now abandoned, which was a Continuation of application Ser. No. 07/780,306, filed Oct. 22, 1991, abandoned.

BACKGROUND OF THE INVENTION

1. Field of the Invention

The present invention relates to an improved method for the treatment of waste water such as industrial waste water or domestic waste water, by an activated sludge process, where the organic substances contained in the waste water are decomposed with aerobic microorganisms in order to purify the waste water.

2. Description of the Background

Various means of purifying waste water with aerobic microorganisms have been developed in the past and put to practical use, including the so-called activated sludge process. In the conventional apparatus for purification of waste water, the aeration tank where organic substances are decomposed with microorganisms by vigorous aeration does not contain partitions, and aeration is effected uniformly in the aeration tank. In such a case, the pH value of the waste water which is placed in the aeration tank is generally 7 or so, and it has been said that the pH value in the inside of the aeration tank should preferably be slightly alkaline, e.g., from 7 to 8 or so.

On the other hand, various methods of using plural aeration tanks for various purposes have been developed. (For example, refer to Japanese Patent Application Laid-Open Nos. 54-77461, 58-98189, 59-39391, 60-19097 and 62-1496 and J. Ferment. Technol., Vol. 63, No. 4, pages 357 to 362, 1985.)

The present inventors had previously developed an activated sludge process for the treatment of waste water, wherein the aeration tank unit in the activated sludge processing equipment is actually comprised of three tanks of a first tank, a second tank and a third tank. In the process, waste water and microorganisms are fed into the first tank, with the ratio of aeration in the first tank ranging from 0.5 to 0.8 by volume/minute relative to the amount of liquid in the first tank. In the second tank, the ratio of aeration ranges from 0.1 to 0.4 by volume/minute relative to the liquid amount in the second tank, while the ratio of aeration in the third tank ranges from 0.1 to 0.3 by volume/minute relative to the liquid amount in the third tank (Japanese Patent Application Laid-Open No. 1-199694).

On the other hand, various methods using ozone have also been developed in the activated sludge process (Japanese patent Application Laid-Open Nos. 51-76859, 53-32967, 55-27072, 57-122998 and 57-153797).

Among them, the method disclosed in Japanese Patent Application Laid-Open No. 57-122998 is directed to rendering waste ozone gas innoxious by feeding waste ozone gas, which is obtained mainly during the sophisticated treatment of water with activated sludge, into an aeration tank and at the same time improving the sedimentation property of activated sludge. The waste ozone gas of the process ranges in an amount from 0.5 to 3 g per $Nm^3$ of an aeration volume and the operation is carried out by adding $5 \times 10^{-3}$ to $5 \times 10^{-1}$ g/hour of ozone per g hour of activated sludge.

It is known that in the activated sludge process for treating waste water using three aeration tanks, waste water can be treated in a high concentration and high load. However, the method has a problem common to the activated sludge process that bulking occurs during the operation, depending on the kind of waste water employed and other factors. Accordingly, a need continues to exist for an improved method of treating waste water in a three tank aeration system.

SUMMARY OF THE INVENTION

Accordingly, one object of the present invention is to provide an improvement in the activated sludge process of treating waste water by minimizing bulking which occurs in the aeration tank and increasing the amount of organics removed by floc formation.

Briefly, this object and other objects of the present invention as hereinafter will become more readily apparent can be attained in a method for treatment of waste water by an activated sludge process, the equipment for which is provided with an aeration tank unit comprised of three tanks of a first tank, a second tank and a third tank, said waste water and microorganisms being fed into the first tank while the ratio of aeration in the first tank ranged from 0.5 to 0.8 by volume/minute relative to the amount of liquid in said first tank, the ratio of aeration in the second tank ranges from 0.1 to 0.4 by volume/minute relative to the amount of liquid in the said second tank and the ratio of aeration in the third tank ranges from 0.1 to 0.3 by volume/minute relative to the amount of liquid in the third tank, the improvement which comprises carrying out said treatment by passing air containing ozone in an amount of from 0.1 to 0.16 wt % relative to the amount of oxygen during the aeration into the first tank.

DETAILED DESCRIPTION OF THE PREFERRED EMBODIMENTS

As a result of extensive investigations to solve the problem of the activated sludge process having a three tank aeration unit, it has been found that by adding concentrated ozone to the first in tank an amount far smaller than the amount added conventionally for the purposes of decolorization and deodorization, the bulking which occurs in the tank can be greatly reduced and at the same time, the amount of organics removed can be increased because flocs of activated sludge of large sizes will form.

In accordance with the method of the present invention, the aeration tank system is in principle composed of three tanks. One tank may be divided into three parts by partitions, or three separate tanks may be combined to form a three-tank system. These three tanks have the different and separate functions of adsorbing organic substances, oxidizing and decomposing the adsorbed organic substances, and restoring the microorganisms used. In the former case where one tank is divided by partitions into three compartments, the partitions are set vertically from the bottom of the tank so that the waste water to be treated may flow over the partitions. Alternatively, partitions vertically standing from the bottom of the tank and partitions having a slit near the bottom of the tank may be provided alternately to form the desired plural tank compartments.

In the latter case the separate tanks are combined to form a plural tank unit, the upper parts of the tanks may be combined with pipes or, alternatively, the upper parts and the lower parts of the tanks may be combined alternately with each other. The bottom level of the respective tanks is not required to be the same, but, for example, the tanks may be arranged stepwise so that the waste water being processed may flow over the partitions between the adjacent tanks in order.

Regarding the volume ratio of the tanks, it is preferred that the first tank have from 40 to 50% or so of the total volume of the combined three tanks with the second tank having from 20 to 25% or so of the total volume and the third tank having from 20 to 25% or so of the total volume.

Regarding the residence time of the waste water being processed in the tanks, where, as an example, the BOD (biological oxygen demand) concentration of waste water is 3000 mg/liter and the capacity load is 3 kg·BOD/m³·day, the time of treatment ranges from 5 to 6 hours or so in the first tank, from 2 to 3 hours or so in the second tank and from 2 to 3 hours or so in the third tank.

These three aeration tanks constituting the aeration tank unit of the apparatus of the present invention by further be partitioned into sub-parts. Further, the aeration tank unit of the present invention may be combined with various kinds of other conventional pretreatment tank(s) and post-treatment tank(s).

Of the three tanks, the first tank is provided with a feed inlet for the waste water to be treated and an introduction inlet for the re-circulated sludge from the sludge separating means. These inlets are necessary for the purpose of displaying the above-mentioned various functions of the present process, and the waste water to be treated and the re-circulated sludge are introduced into the first tank in accordance with the present invention. On the other hand, since the tanks are aeration tanks, the tanks individually must be provided with an aeration means. Suitable aeration means include the conventional one which is generally used in conventional aeration apparatus. The extent of aeration is different in each of the three stages in accordance with the respective ratios of the aeration tanks. That is, the ratio of aeration in the first tank is defined as from 0.5 to 0.8 by volume/minute or so relative to the amount of liquid in the tank, while in the second tank, the ratio of aeration is defined as from 0.1 to 0.4 by volume/minute or so relative to the amount of liquid in the tank. In the third tank, the aeration ratio ranges from 0.1 to 0.3 by volume/minute or so to the amount of liquid in the tank. Accordingly, the extent of aeration ranges from 50 to 70% or so in the first tank, from 20 to 30% or so in the second tank, and from 10 to 20% or so in the third tank. Regarding the dissolved oxygen concentration in each aeration tank, the concentration is from 0.5 to 1 ppm or so in the first tank, from 1 to 3 ppm or so in the second tank, and from 0.5 to 1 ppm in the third tank.

The method of the present invention is characterized by the fact that the ozone is fed into the first tank in an amount of from 0.01 to 0.16 wt % relative to the amount of oxygen during the aeration in the first tank. The ozone may be added continuously or intermittently. When the said ozone is added intermittently, the amount is controlled so that it ranges from 0.01 to 0.16 wt % relative to the total amount of oxygen.

In another aspect of the present process, the pH value of the liquid in each of the aeration tanks is in the range of from 6.0 to 7.0 under such conditions that the liquid in the first tank has the lowest pH value and the liquids in the remaining second and third tanks have higher pH values in order. It is preferred that the pH value in the first tank is from 6.0 to 6.5 or so, while that of the second tank is from 6.1 to 6.7 or so. Finally, the pH of the third tank should range from 6.3 to 7.0 or so.

The adjustment of pH in the first tank is accomplished by adjustment of the pH value of the raw waste water fed thereinto, and the pH of the liquid in the second and third tanks is accomplished by adjustment of the extent of aeration in each tank. The temperature of the aeration tank unit may be the same as that in conventional aeration tanks, and for example, may be 15° to 43° C. or so, generally 20° to 30° C. or so. The sludge load in the aeration tank unit should be adjusted to fall within the range of from 0.5 to 1 kg·BOD/kg·SS·day. "kg·BOD" indicates the weight unit of BOD. "kg·SS" indicates the weight unit of suspended solids (mainly, microorganisms). Accordingly, "kg·BOD/kg·SS·day" indicates the kg amount of BOD per 1 kg of suspended solids per day.

Sludge load adjustment may be achieved by reducing the amount of the sludge re-circulated to lower the MLSS (mixed liquor suspended solids) concentration. In place of such adjustment, an effective alternative is to control the amount of the sludge fed in a short cycle of, for example, 1.5 to 4 days or so. The amount of the sludge to be re-circulated to the aeration tanks may also be utilized as a standard for adjusting the aeration time in each tank in accordance with the biodecomposable characteristic of the waste water to be treated therein.

The sludge restoration time should range from 1 to 10 hours or so after COD (chemical oxygen demand) equilibration is reached. Restoration is achieved in the third tank in the case of the three-tank aeration unit. Apart from this, another aeration tank for activation may be added to the aeration unit of the present invention so that restoration may be accomplished in the added tank.

The waste water load is 5 kg·BOD/m³·day or less, generally from 2 to 3 kg·BOD/m³·day or so. The concentration thereof may be from 1,000 to 5,000 ppm as BOD. The above-mentioned method is in principle carried out in a three-tank aeration unit, but it may also be carried out in one aeration tank under the condition that the tank is batchwise used to act as the first, second and third tanks to achieve the respective aeration conditions.

In general, the drainage withdrawn from the aeration tank may directly be subjected to separation of sludge therefrom without any post-treatment such as precipitation of microorganisms. The separation may be effected by conventional methods, for example, by flocculation separation in a flocculation tank or by centrifugal separation in a centrifugal separator, but the use of the former flocculation tank is preferred. A part of the thus separated sludge is re-circulated into the aeration tank, and the residue is treated by firing or by formation of fertilizer.

The kinds of sludge microorganisms for use in the method of the present invention are not specifically limited but conventional sludge microorganisms may directly be used.

As a matter of course, the type of waste water treated by the method of the present invention is not specifically limited, provided that it may be purified with microorganisms. For example, the method of the present invention may be especially advantageously applied to the treatment of domestic waste water, as well as to other waste waters generated, for example, by fermentation to produce glutamic acid and other various kinds of amino acids.

Functions

In the aeration tank unit composed of three tanks of a first tank, a second and a third tank, sludge microorganisms adsorb the organic substances in the waste water to be treated and a portion of the microorganisms begins oxidation and decomposition of the substances in the first tank. The organic substances, as adsorbed by the sludge microorganisms, are further decomposed by the said microorganisms in the second tank, and the sludge microorganisms are activated in the third tank.

By adding a trace amount of ozone to the first aeration tank of equipment used for the activates sludge process, proliferation of filamentous microorganisms in the activated sludge can be controlled and its occupancy is maintained in the suitable range to prevent bulking and at the same time, the flocculating ability of the sludge microorganisms is enhanced. Furthermore, the ratio of COD removal can also be improved.

Having now generally described this invention, a further understanding can be obtained by reference to certain specific examples which are provided herein for purposes of illustration only and are not intended to be limiting unless otherwise specified.

EXAMPLE 1

An aeration tank having a length of 33 cm, a width of 12 cm and a height (liquid depth) of 20 cm was used, which was partitioned with two partition plates each having a width of 12 cm and a height of 20 cm into three parts in the length direction. The three parts comprised a first compartment of 60%, a second compartment of 20% and a third compartment of 20% by volume in order. Activated sludge microorganisms having an MLSS concentration of about 4,000 ppm and containing filamentous microorganisms of about 40% were placed in the tank, and industrial waste water consisting mainly of an amino acid fermentation waste water was introduced thereinto in an amount of 7.2 liters/day, the pH value of the waste water fed was adjusted to about 3.5. Aeration in the first tank was effected in an amount of 3 liters/minute in air containing ozone at a concentration of about 120 ppm, which corresponds to an amount of about 50 mg/hour, an amount of about 0.07 wt/wt % relative to the amount of oxygen in the aeration, an amount of about 120 ppm by volume/volume relative to the amount of air, an amount of about 50 g per kg of activated sludge MLSS, an amount of about 150 g per m$^3$·day of the aeration tank volume and an amount of about 60 g per kg of BOD treated in the aeration tank. Aeration was accomplished in an amount of 0.7 liters/minute in the first tank and 0.3 liters/minute in the third tank. The thus aerated and mixed water was introduced into a precipitation tank having a length of 8 cm, a width of 12 cm and a depth of 20 cm where the activated sludge microorganisms were precipitated and separated from the water. The liquid in the bottom of the precipitation tank was re-circulated at a flow speed of 7.2 liters/day as a re-circulated sludge. Under these conditions, continuous running was carried out for 30 days.

For comparison, the same activated sludge microorganisms were put in the same aeration tank, and the same industrial waste waters were treated by the same aeration ratio under the same conditions except that the ozone was not present. The same continuous running was carried out for 30 days.

The results obtained are shown in Table 1.

TABLE 1

|  | This Invention | Prior Art |
| --- | --- | --- |
| TOC concentration of fed waste water (mg/l) | 1000 | 1000 |
| BOD concentration of fed waste water (mg/l) | 2500 | 2500 |
| TOC concentration of treated waste water (mg/l) | 87 | 105 |
| TOC removal ratio (%) | 91.3 | 89.5 |
| Absorbance of treated water* (-logT) | 0.29 | 0.58 |
| Transparency of treated water** (cm) | 28 | 6 |
| Occupancy of filamentous microorganisms (%) | 10 | 30 |

TABLE 1-continued

|  | This Invention | Prior Art |
| --- | --- | --- |
| Size of activated sludge flock (large or small) | large | small |

*The absorbance which was measured at a wavelength of 365 nm and a cell length of 10 mm, after the treated water was filtered through a quantitative filter paper No. 5 (Toyo-Roshi Company).
**The data which the treated water itself was carried out in a transparency apparatus.

EXAMPLE 2

An aeration tank having a length of 33 cm, a width of 12 cm and a height (liquid depth) of 20 cm was used, which was partitioned with two partition plates each having a width of 12 cm and a height of 20 cm into three compartments in the length direction. The three compartments comprised a first compartment of 60%, a second compartment of 20% and a third compartment of 20% by volume in order. Activated sludge microorganisms having an MLSS concentration of about 4,000 ppm and containing filamentous microorganisms of about 30% were placed in the said tank, and an industrial waste water consisting mainly of an amino acid fermentation waste water was introduced thereinto in an amount of 7.2 liters/day, the pH value of the waste water fed being adjusted to be about 3.5. Aeration in the first tank was effected in an amount of 3 liters/minute in air containing ozone at a concentration of about 90 ppm, which corresponds to an amount of ozone of about 30 mg/hour, an amount of about 0.05 wt/wt % relative to the oxygen amount in the aeration, an amount of about 90 ppm by volume/volume relative to the amount of air, an amount of about 40 g per kg of activated sludge MLSS, an amount of about 100 g per m$^3$·day of the aeration tank volume and an amount of about 40 g per kg of BOD treated in the aeration tank. Aeration was accomplished in an amount of 0.7 liters/minute in the first tank and 0.3 liters/minute in the third tank. The thus aerated and mixed water was introduced into a precipitation tank having a length of 8 cm, a width of 12 cm and a depth of 20 cm where the activated sludge microorganisms were precipitated and separated from said water. The liquid in the bottom of the precipitation tank was re-circulated at a flow speed of 7.2 liters/days as a re-circulated sludge. Under these conditions, continuous running was carried out for 30 days.

For comparison, the same activated sludge microorganisms were put in the same aeration tank, and the same industrial waste waters were treated by the same aeration ratio present under the same conditions except that the ozone was not present. The same continuous running was carried out for 30 days.

The results obtained were shown in Table 2.

TABLE 2

|  | This Invention | Prior Art |
| --- | --- | --- |
| TOC concentration of fed waste water (mg/l) | 800 | 800 |
| BOD concentration of fed waste water (mg/l) | 1900 | 1900 |
| TOC concentration of treated waste water (mg/l) | 66 | 99 |
| TOC removal ratio (%) | 91.8 | 88.8 |
| Absorbance of treated water | 0.24 | 0.44 |

TABLE 2-continued

|  | This Invention | Prior Art |
| --- | --- | --- |
| (-logT) | | |
| Transparency of treated water (cm) | 24 | 13 |
| Occupancy of filamentous microorganisms (%) | 15 | 30 |
| Size of activated sludge flock (large or small) | large | small |

EXAMPLE 3

Three polypropylene buckets each having an upper diameter of 50 cm, a lower diameter of 42 cm and a height of 80 cm were prepared. An overflow port was provided at an inner volume of 100 liters for one bucket and at an inner volume of 70 liters for the other two. These buckets were connected to each other by the overflow ports through a hose in series, thereby constituting an aeration tank having a total volume of 240 liters.

Activated sludge microorganisms having an MLSS concentration of about 4,000 ppm and containing filamentous microorganisms of about 30% were put into the tank, and industrial waste water consisting mainly of an amino acid fermentation waste water was introduced thereinto in an amount of 240 liters/day, the pH value of the waste water fed being adjusted to about 3.5. Aeration in the first tank was effected in an amount of 90 liters/minute in air containing ozone at a concentration of about 120 ppm, which corresponds to an amount of ozone of about 1.4 g/hour, an amount of about 0.06 wt/wt % relative to the oxygen amount in the aeration, an amount of about 120 ppm by volume/volume relative to the amount of air, an amount of about 40 g per kg of activated sludge MLSS, an amount of about 140 g per m³·day of the aeration tank volume and an amount of about 60 g per kg of BOD treated in the aeration tank. Aeration was accomplished in an amount of 20 liters/minute in the first tank and 10 liters/minute in the third tank. The thus aerated and mixed water was introduced into a precipitation tank having a diameter of 30 cm and a depth of 30 cm where the activated sludge microorganisms were precipitated and separated from the water. The liquid in the bottom of the precipitation tank was re-circulated at a flow speed of 240 liters/day as a re-circulated sludge. Under these conditions, continuous running was carried out for 30 days.

For comparison, the same activated sludge microorganisms were put in the same aeration tank, and the same industrial waste waters were treated by the same aeration ratio under the same conditions except that the ozone was not present. The same continuous running was carried out for 30 days.

The results obtained were shown in Table 3.

TABLE 3

|  | This Invention | Prior Art |
| --- | --- | --- |
| TOC concentration of fed waste water (mg/l) | 920 | 920 |
| BOD concentration of fed waste water (mg/l) | 2200 | 2200 |
| TOC concentration of treated waste water (mg/l) | 84 | 91 |
| TOC removal ratio (%) | 90.9 | 90.1 |

TABLE 3-continued

|  | This Invention | Prior Art |
| --- | --- | --- |
| Absorbance of treated water (-logT) | 0.35 | 0.54 |
| Transparency of treated water (cm) | 18 | 10 |
| Occupancy of filamentous microorganisms (%) | 15 | 30 |
| Size of activated sludge flock (large or small) | large | small |

EXAMPLE 4

Three polypropylene buckets each having an upper diameter of 50 cm, a lower diameter of 42 cm and a height of 80 cm were prepared. Each bucket was provided with an overflow port. One bucket had an inner volume of 100 liters, while the other two buckets each had an inner volume of 70 liters. These buckets were connected to each other by the overflow ports through a hose in a series, thereby constituting an aeration tank having a total volume of 240 liters.

Activated sludge microorganisms having an MLSS concentration of about 4,000 ppm and containing filamentous microorganisms of about 40% were added to the tank, and industrial waste water consisting mainly of an amino acid fermentation waste water was introduced thereinto in an amount of 240 liters/day, the pH value of the waste water fed being adjusted to about 3.5. Aeration in the first tank was effected in an amount of 90 liters/minute containing ozone at a concentration of about 50 ppm, which corresponds to an amount of ozone of about 0.4 g/hour, an amount of about 0.02 wt./wt. % relative to the oxygen amount in the aeration, an amount of about 50 ppm by volume/volume relative to the amount of air an amount of about 15 g per Kg of activated sludge MLSS, an amount of about 40 g per m³·day of the aeration tank volume and an amount of about 20 g per kg of BOD treated in the aeration tank. Aeration was accomplished in an amount of 20 liters/minute in the first tank and 10 liters/minute in the third tank. The thus aerated and mixed water was introduced into a precipitation tank having a diameter of 30 cm and a depth of 30 cm where the activated sludge microorganisms were precipitated and separated from the water. The liquid in the bottom of the precipitation tank was re-circulated at a flow speed of 240 liters/days as a re-circulated sludge. Under these conditions, continuous running was carried out for 30 days.

For comparison, the same activated sludge microorganisms were added to the same aeration tank, and the same industrial waste waters were treated by the same aeration ratio under the same conditions except that the ozone was not present. The same continuous running was carried out for 30 days.

The results obtained are shown in Table 4.

TABLE 4

|  | This Invention | Prior Art |
| --- | --- | --- |
| TOC concentration of fed waste water (mg/l) | 850 | 850 |
| BOD concentration of fed waste water (mg/l) | 2000 | 2000 |
| TOC concentration of treated waste water (mg/l) | 57 | 85 |

TABLE 4-continued

|  | This Invention | Prior Art |
| --- | --- | --- |
| TOC removal ratio (%) | 93.3 | 90.0 |
| Absorbance of treated water (-logT) | 0.17 | 0.25 |
| Transparency of treated water (cm) | 26 | 12 |
| Occupancy of filamentous microorganisms. (%) | 10 | 40 |
| Size of activated sludge flock (large or small) | large | small |

EXAMPLE 5

Three polypropylene buckets each having an upper diameter of 50 cm, a lower diameter of 42 cm and a height of 80 cm were prepared. Each bucket was provided with an overflow port. One bucket had an inner volume of 100 liters, while the other two buckets each had an inner volume of 70 liters. These buckets were connected to each other by the overflow ports through a hose in series, thereby constituting an aeration tank having a total volume of 240 liters.

Activated sludge microorganisms having an MLSS concentration of about 4,000 ppm and containing filamentous microorganisms of about 40% were added to the tank, and an industrial waste water consisting mainly of amino acid fermentation waste water was introduced thereinto in an amount of 360 liters/day, the pH value of the waste water fed being adjusted to about 3.5. Aeration in first tank was effected in an amount of 90 liters/minute containing ozone at a concentration of about 50 ppm, which corresponds to an amount of ozone of about 0.4 g/hour, an amount of about 0.02 wt./wt. % relative to the amount of oxygen in the aeration, an amount of about 50 ppm by volume/volume relative to the amount of air, an amount of about 15 g per kg of activated sludge MLSS, an amount of about 40 g per m$^3$·day of the aeration tank volume and an amount of about 20 g per kg of BOD treated in the aeration tank. Aeration was accomplished in an amount of 20 liters/minute in the first tank and 10 liters/minute in the third tank. The thus aerated and mixed water was introduced into a precipitation tank having a diameter of 30 cm and a depth of 30 cm where the activated sludge microorganisms were precipitated and separated from the water. The liquid in the bottom of the precipitation tank was re-circulated at a flow speed of 240 liters/day as a re-circulated sludge. Under these conditions, continuous running was carried out for 30 days.

For comparison, the same activated sludge microorganisms were added to the same aeration tank, and the same industrial waste waters were treated by the same aeration ratio under the same conditions except that the ozone was not present. The same continuous running was carried out for 30 days.

The results obtained are shown in Table 5.

TABLE 5

|  | This Invention | Prior Art |
| --- | --- | --- |
| TOC concentration of fed waste water (mg/l) | 1090 | 1090 |
| BOD concentration of fed waste water (mg/l) | 2600 | 2600 |
| TOC concentration of treated | 77 | 110 |

TABLE 5-continued

|  | This Invention | Prior Art |
| --- | --- | --- |
| waste water (mg/l) |  |  |
| TOC removal ratio (%) | 92.9 | 89.9 |
| Absorbance of treated water (-logT) | 0.31 | 0.51 |
| Transparency of treated water (cm) | 26 | 15 |
| Occupancy of filamentous microorganisms (%) | 15 | 40 |
| Size of activated sludge flock (large or small) | large | small |

EXAMPLE 6

Three polypropylene-made buckets each having an upper diameter of 50 cm, a lower diameter of 42 cm and a height of 80 cm were prepared. Each bucket was provided with an overflow port. One bucket had an inner volume of 100 liters, while the other two buckets each had an inner volume of 70 liters. These buckets were connected to each other by the overflow ports through a hose in series, thereby constituting an aeration tank having a total volume of 240 liters.

Activated sludge microorganisms having an MLSS concentration of abut 4,000 ppm and containing filamentous microorganisms of about 40% were added to the tank, and an industrial waste water consisting mainly of an amino acid fermentation waste water was introduced thereinto in an amount of 240–360 liters/day, the pH value of the waste water fed being adjusted to be about 3.5. Aeration in the first tank was effected in an amount of 90 liters/minute in air containing ozone at a concentration of about 230 ppm, which corresponds to an amount of about 2.7 g/hour, an amount of about 0.16 wt./wt. % relative to the amount of oxygen in the aeration, an amount of about 230 ppm by volume/volume relative to the amount of air, an amount of about 120 g per kg of activated sludge MLSS, an amount of about 500 g per m$^3$·day of the aeration tank volume and an amount of about 200 g per kg of BOD treated in the aeration tank. Aeration was effected in an amount of 20 liters/minute in the first tank and 10 liters/minute in the third tank.

The concentration of MLSS in the aeration tank was adjusted to an amount of liquid volume sufficient to maintain a BOD load of the activated sludge of from 0.5 to 0.8 kg per kg·SS·day. Thus aerated and mixed water was introduced into a precipitation tank having a diameter of 30 cm and a depth of 30 cm where the activated sludge microorganisms were precipitated from the water. The liquid in the bottom of the precipitation tank was re-circulated at a flow speed of 240 liters/day as a re-circulated sludge. Under these conditions, continuous running was carried out for 30 days.

For comparison, the same activated sludge microorganism were put in the same aeration tank, and the same industrial waste waters were treated by the same aeration ratio under the same condition except that the ozone was not present. The same continuous running was carried out for 30 days.

The results obtained were shown in Table 6.

TABLE 6

|  | This Invention | Prior Art |
|---|---|---|
| TOC concentration of fed waste water (mg/l) | 910 | 910 |
| BOD concentration of fed waste water (mg/l) | 2200 | 2200 |
| TOC concentration of treated waste water (mg/l) | 70 | 108 |
| TOC removal ratio (%) | 92.3 | 88.1 |
| Absorbance of treated water (-logT) | 0.28 | 0.47 |
| Transparency of treated water (cm) | 15 | 12 |
| Occupancy of filamentous microorganisms (%) | 5 | 40 |
| Size of activated sludge flock (large or small) | medium | small |

EXAMPLE 7

Three polypropylene-made buckets each having an upper diameter of 50 cm, a lower diameter of 42 cm and a height of 80 cm were prepared. Each bucket was provided with an overflow port. One bucket had an inner volume of 100 liters, while the other two buckets each had an inner volume of 70 liters. These buckets were connected to each other by the overflow ports through a hose in series, thereby constituting an aeration tank having a total volume of 240 liters.

Activated sludge microorganisms having an MLSS concentration of about 4,000 ppm and containing filamentous microorganisms of about 40% were put into the same tank, and an industrial waste water consisting mainly of an amino acid fermentation waste water was introduced thereinto in an amount of 240 liters/day, the pH value of the waste water fed being adjusted to be about 3.5. Aeration in the first tank was effected in an amount of 120 liters/minute in air containing ozone at a concentration of about 250 ppm, which corresponds to an amount of about 4 g/hour, an amount of about 0.18 wt./wt. % relative to the amount of oxygen in the aeration, an amount of about 250 ppm by volume/volume relative to the amount of air, an amount of about 100 g per kg of activated sludge MLSS, an amount of about 400 g per $m^3$·day of the aeration tank volume and an amount of about 200 g per kg of BOD treated in the aeration tank. Aeration was effected in an amount of 20 liters/minute in the first tank and 10 liters/minute in the third tank. The thus aerated and mixed water was introduced into a precipitation tank having a diameter of 30 cm and a depth of 30 cm where the activated sludge microorganisms were precipitated and separated from the water. The liquid in the bottom of the precipitation tank were re-circulated at a flow speed of 240 liters/day as a re-circulated sludge. Under these conditions, continuous running was carried out for 30 days.

For comparison, the same activated sludge microorganisms were added to the same aeration tank, and the same industrial waste waters were treated by the same aeration ratio under the same condition except that the ozone was not present. The same continuous running was carried out for 30 days.

In the event the amount of ozone is about 0.18 wt./wt. % relative to the amount of oxygen in the aeration of the first tank, TOC removal ratio was worse than the prior art.

The results obtained are shown in Table 7.

TABLE 7

|  | This Invention ($O_3$ amount of 0.18 wt. %) | Prior Art |
|---|---|---|
| TOC concentration of fed waste water (mg/l) | 820 | 820 |
| BOD concentration of fed waste water (mg/l) | 2000 | 2000 |
| TOC concentration of treated waste water (mg/l) | 100 | 79 |
| TOC removal ratio (%) | 87.8 | 90.4 |
| Absorbance of treated water (-logT) | 0.36 | 0.55 |
| Transparency of treated water (cm) | 5 | 15 |
| Occupancy of filamentous microorganisms (%) | <5% | 40 |
| Size of activated sludge flock (large or small) | none (by death) | small |

Effects of the Invention

In accordance with the method of the present invention, generation of blocking can be prevented and the operation for the activated sludge treatment can be continued stably. The flocculating property of the activated sludge flock is good, and the sludge microorganisms can be easily isolated from the treated water. The activity of sludge microorganisms can be enhanced and the ratio of the removal of the total organic carbon can also be improved.

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. In a method for treatment of waste water by an activated sludge process the equipment for which is provided with an aeration tank unit comprised of three tanks of a first tank, a second tank and a third tank, said waste water and microorganisms being fed into the first tank while the ratio of aeration in the first tank ranges from 0.5 to 0.8 by volume/minute relative to the amount of liquid in the first tank, the ratio of aeration in the second tank ranges from 0.1 to 0.4 by volume/minute relative to the amount of liquid in the said second tank and the ratio of aeration in the third tank ranges from 0.1 to 0.3 by volume/minute relative to the amount of liquid in the third tank, the improvement which comprises carrying out said treatment by passing air containing ozone in an amount of from 0.01 to 0.16 wt. % relative to the amount of oxygen in the air during the aeration into the first tank.

2. The method for treatment of waste water as claimed in claim 1, in which the amount of ozone in the first tank is from 1 to 120 g per kg of activated sludge MLSS (1–120 g—$O_3$kg·MLSS·day).

3. The method for treatment of waste water claim 1, in which the amount of ozone in said first tank is from 5 to 500 per $m^3$ per day of said first aeration tank volume (5–500 g—$O_3/m^3$·day).

4. The method for treatment of waste water as claimed in claim 1, in which the amount of ozone in said first tank is from 2 to 200 g per kg of BOD in said first tank (2–200 g—$O_3$/kg-BOD).

5. The method for treatment of waste water as claimed in claim 1, wherein the first tank has from 40 to 50% of the total volume of the combined three tanks.

6. The method for treatment of waste water as claimed in claim 1, wherein the second tank has from 20 to 25% of the total volume of the combined three tanks.

7. The method for treatment of waste water as claimed in claim 1, wherein the third tank has from 20 to 25% of the total volume of the combined three tanks.

8. The method for treatment of waste water as claimed in claim 1, wherein sludge restoration occurs in the third tank for a time ranging from 1 to 10 hours after chemical oxygen demand equilibration is reached.

* * * * *